United States Patent [19]

Stearns

[11] Patent Number: 5,778,096
[45] Date of Patent: Jul. 7, 1998

[54] DECOMPRESSION OF MPEG COMPRESSED DATA IN A COMPUTER SYSTEM

[75] Inventor: Charles C. Stearns, San Jose, Calif.

[73] Assignee: S3, Incorporated, Santa Clara, Calif.

[21] Appl. No.: 489,488

[22] Filed: Jun. 12, 1995

[51] Int. Cl.$^6$ .................................. G06K 9/36; G06K 9/46
[52] U.S. Cl. ..................... 382/233; 382/234; 382/246; 348/461; 358/432; 358/433; 395/162; 395/412; 395/439
[58] Field of Search ........................... 382/233, 246, 382/234; 358/432, 433; 395/162, 412, 439; 348/461

[56] References Cited

U.S. PATENT DOCUMENTS

| | | | |
|---|---|---|---|
| 5,212,742 | 5/1993 | Normile et al. | 382/234 |
| 5,335,321 | 8/1994 | Harney et al. | 395/162 |
| 5,379,356 | 1/1995 | Purcell et al. | 382/233 |
| 5,394,534 | 2/1995 | Kulakowski et al. | 395/439 |
| 5,493,339 | 2/1996 | Birch et al. | 348/461 |

FOREIGN PATENT DOCUMENTS

| | | |
|---|---|---|
| 0 503 956 | 9/1992 | European Pat. Off. |
| 95 32578 | 11/1995 | WIPO |

OTHER PUBLICATIONS

Foley, P.: "The Mpact Media Processor Redefines The Multimedia PC", IEEE Comput. Soc. Press, USA, pp. 311–318, XP000577494, proceedings of Compcon '96.

Gruger, K., et al.: MPEG–1 Low Cost Encoder Solution, Proceedings of the SPIE—The International Society for Optical Engineering, 1995, USA, pp. 41–51, XP000577418, Advanced Image and Video Communications and Storage Technologies, Amsterdam, Netherlands, 20–23 Mar. 1995.

*Primary Examiner*—Leo H. Boudreau
*Assistant Examiner*—Daniel G. Mariam
*Attorney, Agent, or Firm*—Skjerven, Morrill, MacPherson, Franklin & Friel LLP; Norman R. Klivans

[57] ABSTRACT

MPEG compressed data is decompressed in a computer system by sharing computational decompression tasks between the computer system host microprocessor, the graphics accelerator, and a dedicated MPEG processor in order to make best use of resources in the computer system. Thus the dedicated MPEG processor is of minimum capability and hence advantageously minimum cost. The host microprocessor is used to decompress the MPEG upper data layers. The more powerful the host microprocessor, the more upper data layers it decompresses. The remainder of the decompression (lower data layers) is performed by the MPEG dedicated processor and/or the graphics accelerator.

15 Claims, 11 Drawing Sheets

Microfiche Appendix Included
(1 Microfiche, 51 Pages)

```
0   1   2   3   4   5   6   7
8   9  10  11  12  13  14  15
16  17  18  19  20  21  22  23
24  25  26  27  28  29  30  31
32  33  34  35  36  37  38  39
40  41  42  43  44  45  46  47
48  49  50  51  52  53  54  55
56  57  58  59  60  61  62  63
              ↓
0   1   5   6  14  15  27  28
2   4   7  13  16  26  29  42
3   8  12  17  25  30  41  43
9  11  18  24  31  40  44  53
10  19  23  32  39  45  52  54
20  22  33  38  46  51  55  60
21  34  37  47  50  56  59  61
35  36  48  49  57  58  62  63
```

DECOMPRESSION OF MPEG COMPRESSED DATA IN A COMPUTER SYSTEM

CROSS-REFERENCE TO RELATED APPLICATIONS

This application is related to and commonly owned U.S. patent applications Ser. No. 08/490,322, filed Jun. 12, 1995, entitled "Video Decoder Engine", Soma Bhattacharjee et al., and Ser. No. 08/489,489, filed Jun. 12, 1995, now U.S. Pat. No. 5,719,998, issued Feb. 17, 1998 entitled "Partitioned Decompression of Audio Data Using Audio Decoder Engine For Computationally Intensive Processing," Charlene S. Ku et al., both incorporated by reference.

MICROFICHE APPENDIX

A microfiche appendix including 1 fiche and a total of 51 frames is a part of this disclosure.

BACKGROUND OF THE INVENTION

1. Field of the Invention

This invention relates to data decompression, and specifically to decompression of MPEG compressed data in a computer system.

2. Description of Prior Art

The well-known MPEG (Motion Picture Experts Group) data standard defines two compression/decompression processes, called conventionally MPEG 1 and MPEG 2. For purposes of this disclosure, MPEG 1 and MPEG 2 are similar. The MPEG 1 standard is described in the ISO publication No. ISO/IEC 11172: 1993 (E), "Coding for moving pictures and associated audio . . . ", and the MPEG 2 standard is defined in the ISO publication No. ISO/IEC 13818-2, both incorporated by reference herein in their entirety. The MPEG standard defines the format of compressed audio and video data especially adapted for e.g., motion pictures or other live video. MPEG compression is also suitable for other types of data including still pictures, text, etc. The MPEG standard in brief (the above-mentioned publications are more complete) defines the data format structure shown in FIG. 1 for CD-ROM content. The top required layer is the MPEG system layer having underneath it, in parallel, the video layer and audio layer. The MPEG system layer contains control data describing the video and audio layers.

Above (wrapped around) the MPEG system layer is another (optional) layer called the White book ("video CD") or the Green book ("CDI") that includes more information about the particular program (movie). For instance, the book layer could include Karaoke type information, high resolution still images, or other data about how the program content should appear on the screen. The video layer includes sequence (video), picture (frame), slice (horizontal portions of a frame), macroblock (64 pixels by 64 pixels) and block (8 pixels by 8 pixels) layers, the format of each of which is described in detail by the MPEG standard.

There are commercially available integrated circuits (chips) for MPEG decompression. Examples are those sold by C-Cube Microsystems and called the CL-450 and CL-480 products. In these products the MPEG audio and visual decompression (of all layers) is accomplished completely in dedicated circuitry in an internally programmable microcontroller. The book layer and entire MPEG system layer parsed to the last pixel of the compressed data are decompressed using the C-Cube Microsystems products. Thus these chips accomplish the entire decompression on their own, because these chips are intended for use in consumer type devices (not computers). Thus these chips include a system memory, a CD-ROM controller and any necessary processing power to perform complete MPEG decompression.

Similar products are commercially available from a variety of companies. While these products perform the decompression task fully in a functional manner, they are relatively expensive due to their inclusion of the large number of functions dedicated to MPEG decompression. Thus their commercial success has been limited by high cost.

SUMMARY

It has been recognized by the present inventor that in a computer (i.e., personal computer or workstation) environment, that already available elements are capable of performing a large portion of the MPEG decompression task. Thus in this environment use of a dedicated fully functional MPEG decompression integrated circuit is not necessary, and instead a substantial portion of the decompression can be off-loaded onto other conventional computer system elements. Thus only a relatively small portion of the actual data decompression must be performed by dedicated circuitry, if any. In accordance with the invention, the MPEG decompression task is allocated amongst various already existing elements of a typical computer system and if necessary, depending on the capabilities of these other elements, an additional relatively small (hence inexpensive) dedicated MPEG decompression circuit is provided.

Thus advantageously in accordance with the present invention the MPEG (compressed using layers) content of data is decompressed in a computer system typically already including a microprocessor, graphics accelerator, frame buffer, peripheral bus and system memory. A shared computational approach between the microprocessor (host processor), graphics accelerator and a dedicated device makes best use of the computer system existing resources. This is a significant advantage over the prior art where the MPEG decompression is performed entirely by a dedicated processor. Thus in accordance with the invention by partitioning of the decompression process amongst the major available elements in a personal computer, decompression is provided inexpensively.

BRIEF DESCRIPTION OF THE DRAWINGS

Identical reference numbers in different figures refer to similar or identical structures.

DETAILED DESCRIPTION OF THE PREFERRED EMBODIMENTS

As well known, each element in a computer system (e.g., personal computer or workstation) has particular strength and weaknesses. For instance, the microprocessor (host processor) is typically the single most capable and expensive circuit in a computer system. It is intended to execute a single instruction stream with control flow and conditional branching in minimum time. Due to its internal arithmetic units, the microprocessor has high capability for data parsing and data dependent program execution. However, the microprocessor is less capable at transferring large quantities of data, especially data originating from peripheral elements of the computer.

The core logic chip set of a computer interfaces the microprocessor to the peripherals, manages the memory subsystem, arbitrates usage and maintains coherency. However, it has no computational capabilities of its own. The graphics subsystem manages and generates the data which is local to the frame buffer for storing video and graphics data. The graphics subsystem has a capability to transfer large amounts of data but is not optimized for control flow conditional branching operation.

The present inventors have recognized that in MPEG compressed content (video data) having the various layers, each layer has certain characteristics requiring particular hardware (circuit) properties to parse that level of information. For example, it has been determined that in the book and system layers of MPEG, which are the top most layers in the video data stream, the information resembles a program data/code data stream and in fact may contain executable code (software). The information at that level is thus like a program code stream containing control flow information, variable assignments and data structures. Hence it has been recognized that the microprocessor is suited for parsing such information. (The term "parsing" herein indicates the steps necessary to decompress data each layer of the type defined by the MPEG standard.)

Figure 1:
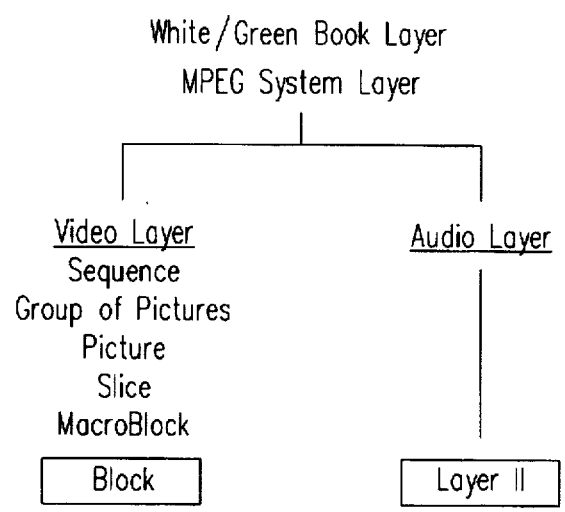
FIG. 1 shows conventional content layering for MPEG compression.

The video layer, under the system layer, includes the compressed video content. There are as described above an additional six layers under the video layer as shown in FIG. 1. These layers are the sequence layer, group of pictures layer, picture layer, slice layer, macroblock layer, and block layer. All but the macroblock and block layers contain additional control and variable information similar to the type of information in the system layer. Thus again the microprocessor is best suited for parsing the information down to but not including the macroblock layer.

Within the macroblock and block layers are compressed pixel data that requires, according to MPEG decompression, steps including 1) variable length decoding (VLD), 2) inverse zig-zagging (IZZ), 3) inverse quantization (IQ), 4) inverse discrete cosine transformation (IDCT), and 5) motion vector compensation (MVC), in that order. The VLD, IZZ, IQ, and especially IDCT are computationally intensive operations, and suitable for a peripheral processor or the microprocessor capabilities, assuming adequate processing capability being available in the microprocessor. However, in some cases depending on the microprocessor capabilities, the microprocessor itself may be insufficient in power or completely utilized already for parsing the upper layers.

The remaining task for video decompression is motion vector compensation (MVC) also referred to as frame reconstruction (FR). MVC requires retrieving large quantities of data from previously decompressed frames to reconstruct new frames. This process requires transferring large amounts of video data and hence is suited for the graphics accelerator conventionally present in a computer system. An example of such a graphics accelerator is the Trident TVP9512, or S3 Inc. Trio 64V.

The audio stream layer under the system layer includes the compressed audio content. Audio decompression requires 1) variable length decoding, 2) windowing, and 3) filtering. Since audio sampling rates are lower than pixel (video) sampling rates, computational power and data bandwidth requirements for audio decompression are relatively low. Therefore, a microprocessor may be capable of accomplishing this task completely, assuming it has sufficient computational power available.

Thus in accordance with the invention the MPEG decompression process is partitioned between the various hardware components in a computer system according to the computational and data bandwidth requirements of the MPEG decompression. Thus the system partitioning depends on the processing power of the microprocessor.

Therefore, while the present invention is applicable to computers including various microprocessors of the types now commercially and to be available, the following description is of a computer systems having a particular class of microprocessor (the 486DX2 class microprocessors commercially available from e.g., Intel and Advanced Micro Devices.) Thus this description is illustrative and the principles disclosed herein are applicable to other types of computer systems including other microprocessors of all types. As a general rule, it has been found empirically that no more than 30% of the microprocessor's computing capability should be used for MPEG decompression in order to preserve the remaining portion for other tasks. It has to be understood that this rule of thumb subjective and somewhat arbitrary; it is not to be is construed as limiting.

Moreover, the actual steps of MPEG decompression and apparatus to perform same are well known; see e.g. U.S. Pat. No. 5,196,946 issued Mar. 23, 1993 to Balkanski et al.; U.S. Pat. No. 5,379,356 issued Jan. 3, 1995 to Purcell et al., and European Patent Application publication 93304152-7, published Jan. 12, 1993, applicant C-Cube Microsystems, Inc. Therefore one skilled in the art will understand how to implement these well-known functions, which may be carried out in a variety of ways, all of which are contemplated in accordance with the invention.

Figure 2:
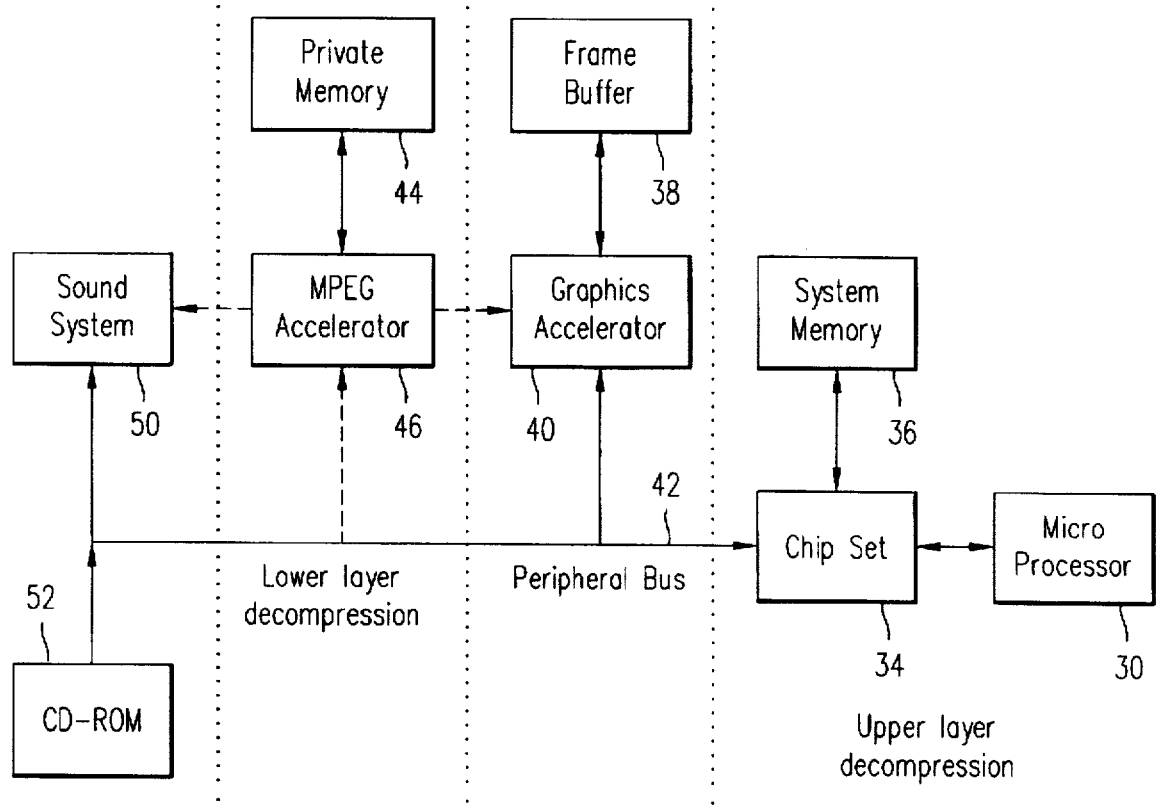
FIG. 2 shows one embodiment of the invention with partitioning of decompression including a dedicated MPEG processor with associated private memory, in a computer.

In accordance with the first embodiment of the present invention shown in FIG. 2, microprocessor 30 (the host processor) has been found only to have computational power sufficient to decompress the MPEG book layer and system layer. Also, in this computer system the graphics accelerator 40 e.g., the Trio 64V chip from S3 Inc. has insufficient computing power to accomplish the motion vector compensation (MVC) decompression. Therefore, a dedicated processor called the MPEG accelerator 46 is provided to perform the remainder of the MPEG decompression tasks. It is to be understood that the MPEG accelerator 46 may be any suitable processor or dedicated logic circuit adapted for performing the required functions. The private memory 44 is e.g. one half megabyte of random access memory used to accomplish the MVC and is distinct from the frame buffer in the FIG. 1 embodiment.

The other elements shown herein including the system memory 36, chip set 34, sound system 50, CD-ROM player 52, and the peripheral bus 42, are conventional. In one version of the FIG. 2 embodiment as shown by the dotted line connecting MPEG accelerator 46 to PCI (peripheral) bus 42, the MPEG accelerator 46 is connected to PCI bus 42 for video and audio decompression and typically would be a chip on an add-in card. The type of microprocessor 30, how the sound system 50 and other elements are connected, and the particular interconnection between the MPEG accelerator 46 and the peripheral bus 42 are not critical to the present invention. Further, the particular partitioning described herein is not critical to the present invention but is intended to be illustrative.

In a second version of the FIG. 2 embodiment, MPEG accelerator connects (see dotted lines) directly to graphics accelerator 40 for video decompression and to sound system 50 for audio decompression, not via peripheral bus 42. This version would be typical where MPEG accelerator 46 is located on the motherboard of the computer.

In FIG. 2, the lower layer MPEG decompression includes the functions performed by the private memory 44 and the MPEG accelerator 46. The upper layer decompression is that performed by microprocessor 30.

It is to be understood that typically the source of the MPEG program material is a CD-ROM to be played on CD-ROM player 52. However, this is not limiting and the program material may be provided from other means such as an external source.

Figure 3:
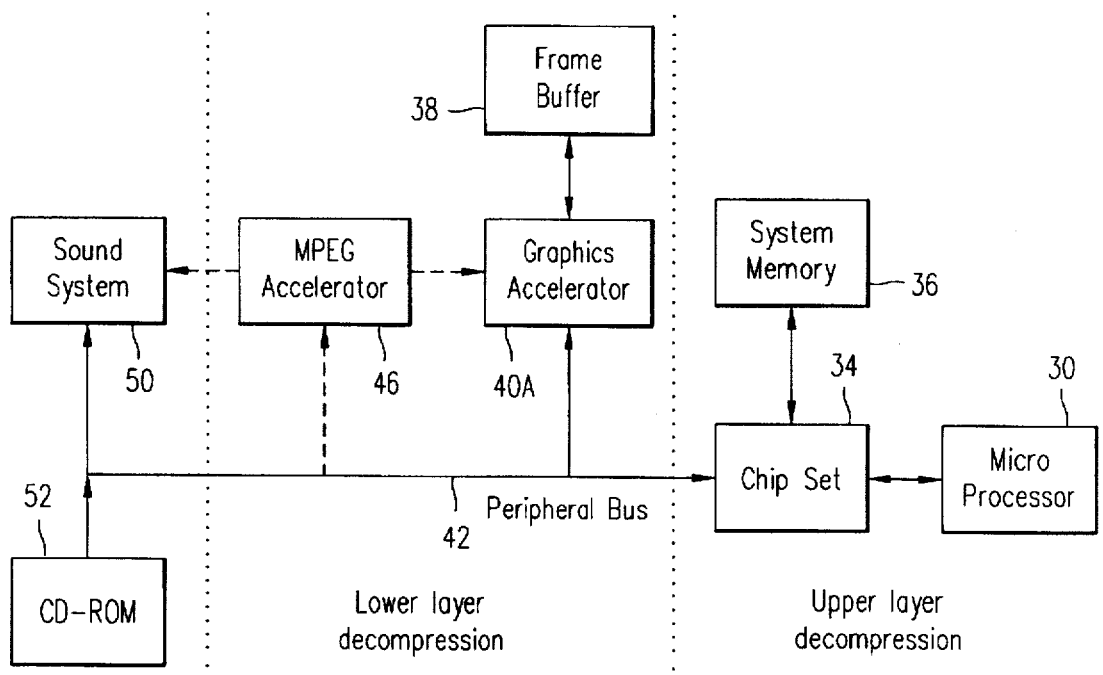
FIG. 3 shows a second embodiment of the invention also with a dedicated MPEG processor in a computer.

A second embodiment is shown in FIG. 3. Again, here the 486 class microprocessor 30 has sufficient computational power only to decompress the book layer and the system layer. In this embodiment a more capable graphics accelerator 40A has the capability to perform the MPEG decompression motion vector compensation (MVC). Therefore, the memory requirement for accomplishing MVC, which was accomplished by the private memory 44 in FIG. 2, here takes place either in the frame buffer 38 or the system memory 36. Therefore, in this case the lower layer decompression includes the functions performed by the graphics accelerator 40A, unlike the case with FIG. 2.

The FIG. 3 embodiment, like that of FIG. 2, has two versions as shown by the dotted lines. In the first version, MPEG accelerator 46 communicates via peripheral bus 42. In the second version, MPEG accelerator 46 is directly connected to sound system 50 for audio decompression and to graphics accelerator 40A for video decompression.

Figure 4:
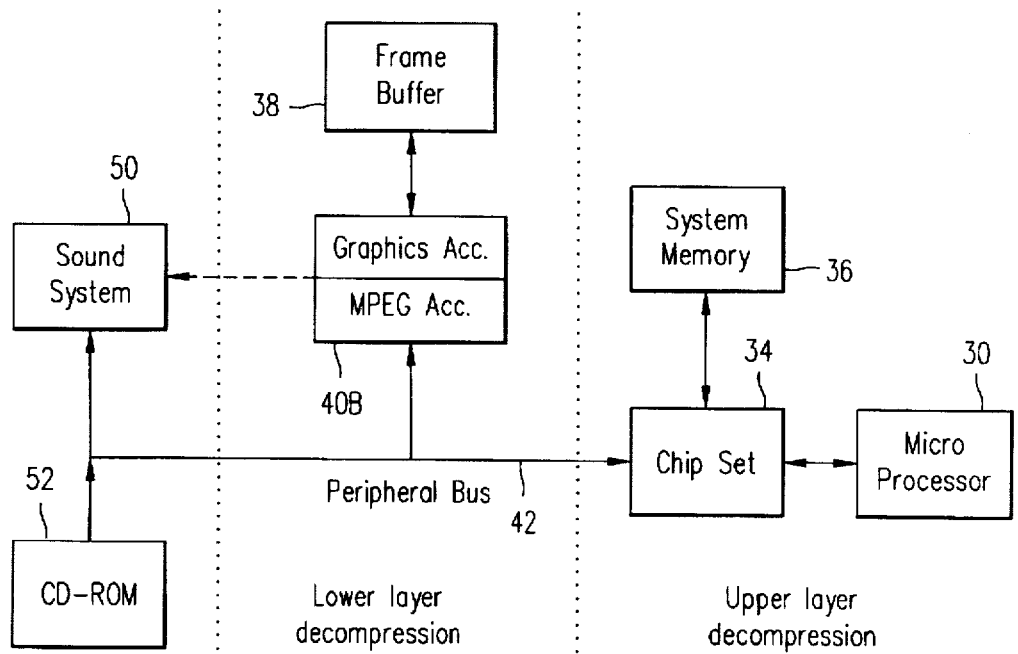
FIG. 4 shows a third embodiment of the invention with partitioning of MPEG compression in a computer system using a high performance graphics accelerator.

A third embodiment is shown in FIG. 4. In this case the MPEG accelerator functionality is included in a yet more powerful graphics accelerator 40B (a graphics controller). As in the embodiment of FIG. 3, the memory storage requirements for motion vector compensation (MVC) are satisfied by the off-screen memory in the frame buffer 38 or a non-cacheable portion of the system memory 36. The decompression of the audio layer is performed by either the sound system 50, the graphics accelerator 40A, or the microprocessor 30.

Also, in accordance with the invention there may be a partitioning of the audio decompression between the microprocessor 30 and a dedicated audio decompression processor which may be part of the MPEG accelerator. A system of this type for audio decompression is disclosed in the above mentioned U.S. patent application Ser. No. 08/489,489, filed Jun. 12, 1995, now U.S. Pat. No. 5,719,998, issued Feb. 17, 1998 entitled "Partitioned Decompression of Audio Data Using Audio Decoder Engine For Computational Intensive Processing," Charlene Ku et al.

Thus in accordance with the invention the MPEG decompression process is partitioned between various elements of a computer system. The more powerful the host microprocessor, the more upper layer decompression tasks it handles. The remainder of the decompression tasks are off-loaded to a dedicated MPEG accelerator (processor) circuit, or to a graphics accelerator already conventionally present in a computer system on a layer-by-layer basis. Thus the need for dedicated circuitry for MPEG decompression is minimized in accordance with the capabilities of the other elements of the computer system, hence reducing total computer system cost and making MPEG decompression more widely available even in low cost computer systems.

The various elements of FIGS. 2, 3, and 4 are conventional, as is their interconnection, except for the MPEG accelerator and the decompression software in the microprocessor.

The following describes a system as shown in present FIG. 2 for video decompression. This particular embodiment of the invention is illustrative and is for MPEG 1 decompression. The two chief elements disclosed herein are (1) the software driver (program) executed by the microprocessor which performs the upper layer video decompression, and (2) the MPEG accelerator circuit which is a dedicated digital signal processor for video decompression.

Figure 5:
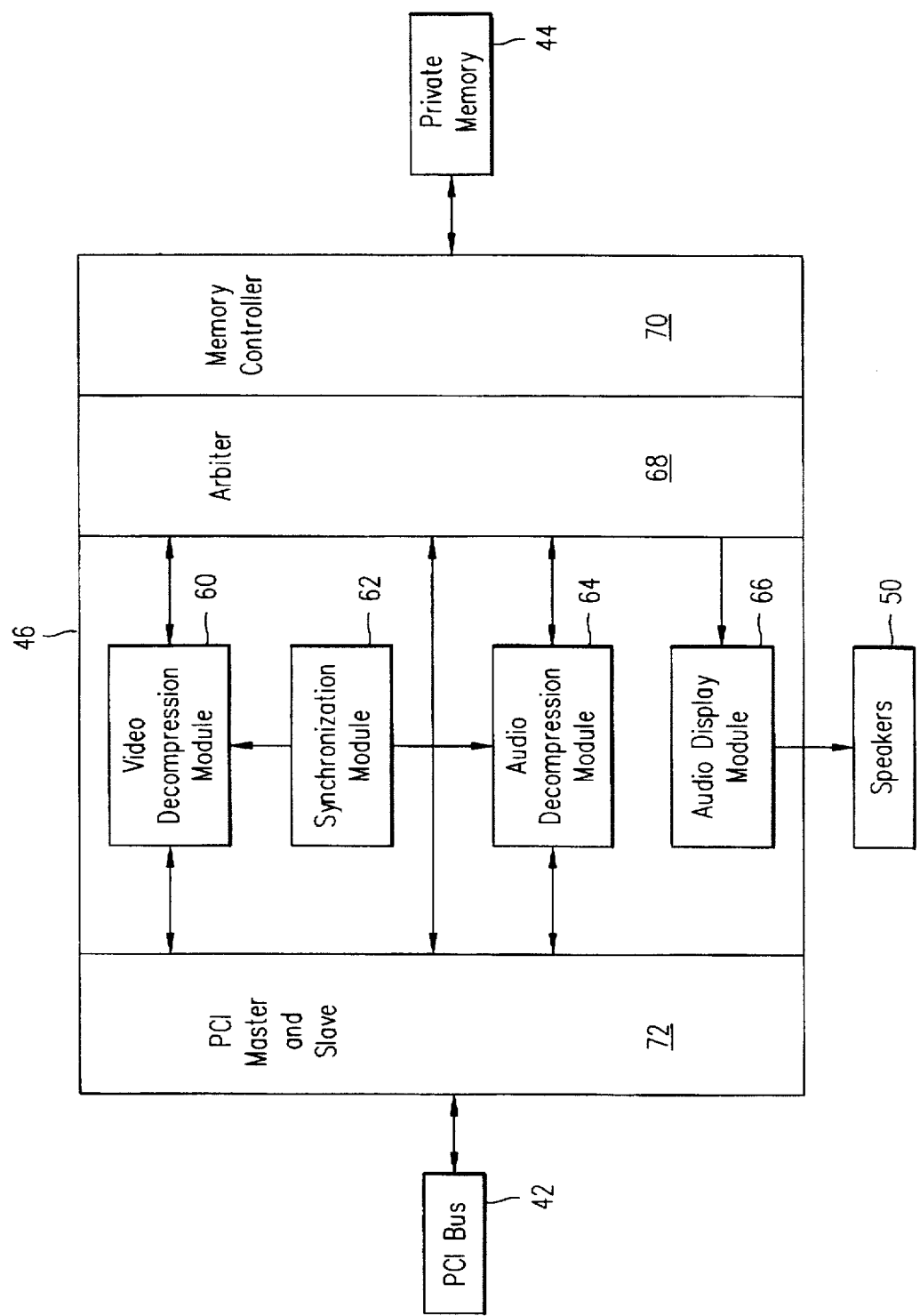
FIG. 5 shows a block diagram of a chip including MPEG video and audio decompression in accordance with the invention.

FIG. 5 shows a high level block diagram of a chip which includes the MPEG accelerator 46 of for instance FIG. 2. This chip provides both video and audio decompression. The video decompression is of the type disclosed herein and the audio decompression is of the type disclosed in the above-referenced copending and commonly owned patent application. The chip includes a video decompression module 60 which includes a video decompression engine (VDE), an audio decompression module which includes an audio decompression engine 64, and a synchronization module 62 for synchronizing the video and audio in their decompressed forms. The VDE is a hardwired (circuitry) engine. Also provided is an audio display module 66 which provides the function of sending decompressed digital audio data to an external DAC.

An arbiter 68 arbitrates amongst the various modules for purposes of private memory access. Also provided is a conventional memory controller 70 which interfaces with the private memory 44 of FIG. 2. Also provided is a peripheral master and slave bus interface 72 interfacing to the peripheral bus (PCI bus) 42.

Detail of the video decompression module 60 of FIG. 5 is described hereinafter.

The host processor decompresses the sequence layer and programs the quantization matrices in the VDE, and then parses the group of pictures layer and programs the VDE to start a frame decompression after it has transferred enough data into the buffer used by the VDE for the input video bit stream. The registers used for programming the VDE are double buffered so that the host processor can program one set at the same time that the VDE uses another set of registers. The VDE performs the rest of the variable length decoding starting from the picture layer down to block layer and does the IQ, IZZ, IDCT and FR on the 8×8 blocks generated by the VLD until the end of a picture, or until programmed to abort a picture. The FR puts decompressed frames in memory. Since the display and decompression order are different, the host processor keeps track of when a frame is ready to be displayed and programs the video decompression module to burst out data to be displayed.

Figure 6:
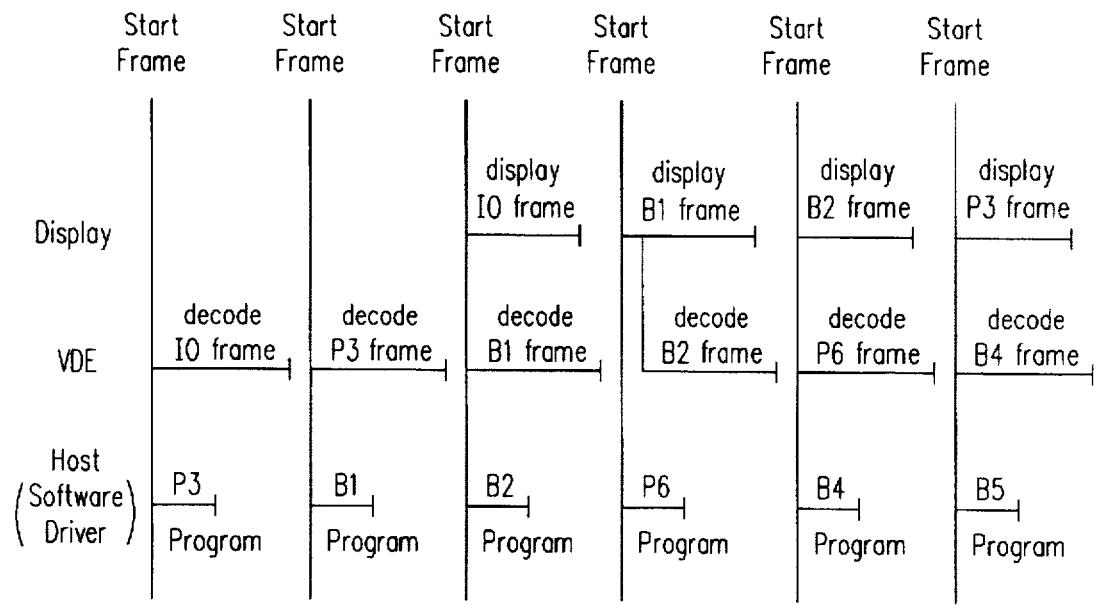
FIG. 6 shows host processor/VDE partitioning of video decompression.

An example of such partitioning is shown in FIG. 6, for frame sequence frames I0, B1, B2, P3, B4, B5, P6. Graceful degradation in accordance with the invention provides the ability to drop some video frames without affecting the quality of video and audio/video synchronization.

There are two main steps for graceful degradation: 1) the VDE is able to abandon a frame decompression and start on the next frame immediately if programmed to do so; 2) the ability of the display engine to suppress displaying an abandoned frame so that there are no visual artifacts on the screen due to a partially decompressed image.

Figure 7:
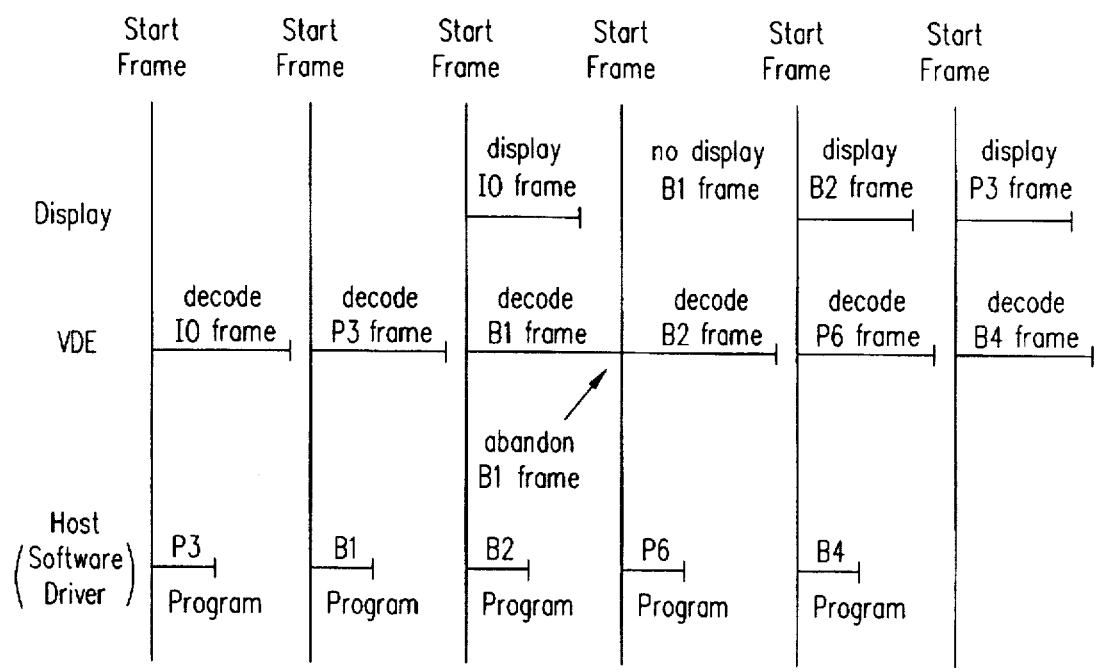
FIG. 7 shows graceful degradation of video decompression by abandoning frames.

The example of FIG. 7 shows the case of frames I0, B1, B2, P3, B4, P6 in display order. Because of the delay in decoding B1 which is abandoned and suppressed (not displayed), the display becomes frames I0, B2, P3, B4, P6. (I, B, P conventionally refer to MPEG frame types.)

The master controller 82 (see FIG. 8) in the VDE interfaces to the host processor (not shown) and controls the flow of data through the pipeline stages VLD 84, IQ/IZZ/IDCT 88 and FR 92. When the master controller 82 is programmed to abort a frame, it resets the main state machines in VLD 84, IQ/IZZ/IDCT 88 and FR 92 and starts a new frame decoding. When the VDE aborts a frame, it signals the display engine (not shown) to suppress displaying the frame. The abort and suppress are usually done to B type frames to minimize the effect on quality, because if I or P type frames are aborted, all the intervening P and B type frames need to be discarded until the next I type frame. The circuitry is in one embodiment overdesigned to be very fast such that this feature (to abort frames due to lack of time) is rarely needed, so that the quality of video and video/audio synchronization is good. These are the rules for abandoning a frame:

1. Start next B frame and abandon current B frame—allowed. Any B frame can be dropped.
2. Start next P frame and abandon current B frame—allowed. Any B frame can be dropped.
3. Start next I frame and abandon current B frame—allowed. Any B frame can be dropped.
4. Start next B frame and abandon current P frame—not allowed since P frame cannot be dropped but the P frame can be given longer time and the next B frame can be abandoned.
5. Start next P frame and abandon current P frame—not allowed since P frame cannot be dropped and each P frame is given more time in this case until an I frame is next, then the uncompressed P frame is dropped.
6. Start next I frame and abandon P frame—allowed. End of predicted sequence.
7. Start next B frame and abandon I frame—not allowed. I frame is given more time in this case and the pending B frame can be dropped in this case.
8. Start next P frame and abandon current I frame—not allowed.
9. Start next I frame and abandon current I frame—allowed.

The VDE is implemented as a three stage pipeline with the master controller 82 controlling the interaction between three pipeline stages. The first pipeline stage is the VLD 84, the second is the IQ/IZZ/IDCT 88 and the third stage is the frame reconstruction (FR) 92. Stages 84, 88, 92 are chosen such that the circuitry associated with each stage is unique. For example, since IQ and IDCT both need a multiplier they are in the same stage to avoid duplicating the multiplier. Another advantage of three stages is that operation is pipelined and all three stages can operate simultaneously, reducing the overall time to decode with minimal circuitry.

To facilitate the three stage pipeline, temporary buffer BUFFER A 96 is placed between first and second stages and two buffers BUFFER B, BUFFER C 100, 102 between the second and third stages, so that IQ/IZZ/IDLT 88 and FR 92 work on different buffers. The buffers 100, 102 between second and third stages 88, 92 are provided because both stages 88, 92 use the buffers 100, 102 for storing intermediate results.

The master controller 82 controls and enables the flow of information from the VLD 84 to IQ/IZZ/IDCT 88 and FR 92. Master controller 82 makes sure that the VLD 84 is two blocks ahead of FR 92 and IQ/IZZ/IDCT 88 is one block ahead of FR 92 during normal operation. In case of skipped macroblocks or in case of a warning caused by a bad variable length code detected by VLD 84, the master controller 82 stalls the VLD 84 and IQ/IZZ/IDCT 88 stages until the FR 92 has finished reconstructing the skipped macroblocks (or the error blocks in case of the warning). In case of such a warning, the VLD skips to the next frame, and the FR must reconstruct the next slice.

The IQ step according to the MPEG 1 specification involves two multiplications, two additions and one saturation operation. To complete the IQ in an optimal number of cycles with minimum circuitry, two adders and one multiplier are provided. The IDCT calculations involve 11 multiplications and 29 additions per row/column. Here again to obtain optimal balance between circuitry and cycles to complete the IDCT, one multiplier and two adders are used. Thus the same circuitry may be used for both the IQ and IDCT in an optimal number of cycles. IDCT reads rows of data from a buffer and writes back the result after 1D-IDCT into the same buffer. IDCT then reads columns of data from the same buffer and does 1D-IDCT and writes them back as columns. Because of this, IDCT avoids doing a transpose operation after the 1D-IDCT on the 8 rows and avoids using a transpose RAM (saving cycles and circuitry respectively).

To reduce cycles in IDCT processing, some of the operations are performed transparently. For example, the first stage in 1D-IDCT on a row/column of 8 elements is shuffle where out [x] is the output element number x after stage 1, and in [x] is the input element number x:

$$out[0]=in [0] \qquad (1)$$

$$out[1]=in[4] \qquad (2)$$

$$out[2]=in[1]$$

In the second stage for example:

$$2nd\_[0]=out[0]+out[1]$$

Instead of using some cycles to read out elements and writing them back at the correct locations, the shuffle operation (part of a well-known algorithm) is a transparent operation going directly to the second stage 88 and reading from the correct locations. In the above example using (1) and (2) this becomes:

$$2nd\_out[0]=in[0]+in[4].$$

In this way eight cycles are eliminated in processing a row/column which would be used for reading each of the eight elements and writing then back for the shuffle.

Figures 8, 9:
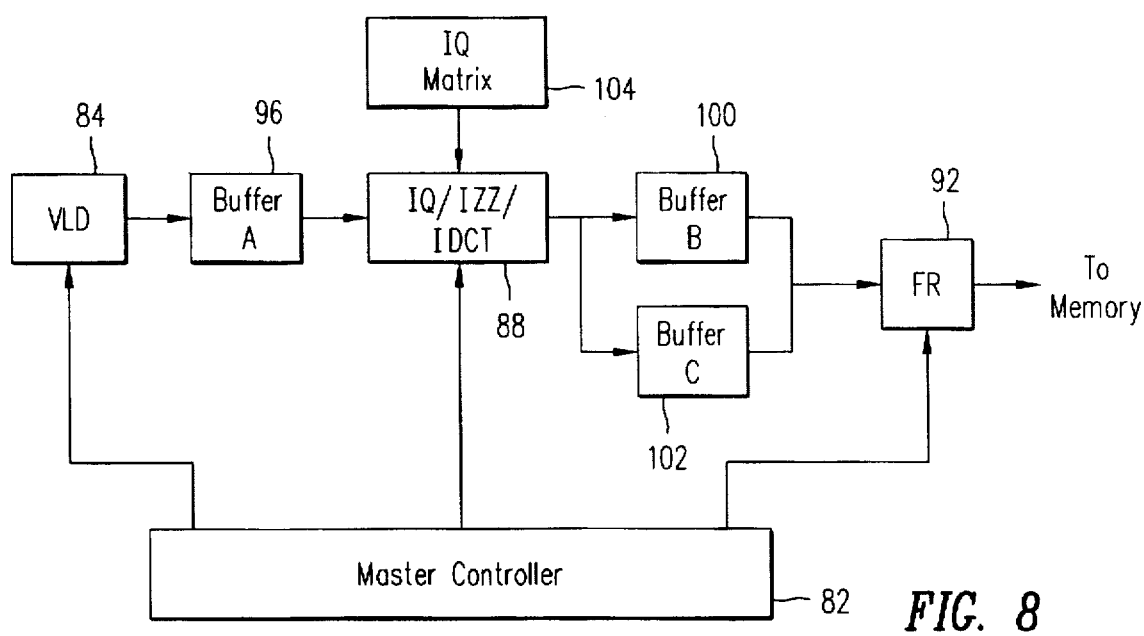
FIG. 8 shows in a block diagram three stage pipelining in the VDE.
FIG. 9 shows a transparent IZZ process.

Also, IZZ is performed transparently during IQ. The DCT coefficients are read in zigzag order from the VLD output buffer, go through IQ and are written to the IQ/IZZ/IDCT buffers 100, 102 in raster scan order as shown in FIG. 9. IQ matrix 104 stores the quantization coefficients. These are multiplied by the DCT coefficients and the quantization scale factors (from the bit stream) per the conventional MPEG IQ process.

The VLD module is in one embodiment purely synthesized logic with no structured memories, i.e. no ROM, RAM or PLA. All the look-up tables are implemented with logic. This advantageously eliminates any need for read only memory.

Since the motion vector calculation requires different circuitry (adder and combinational logic) compared to the rest of the VLD, MVC is done off-line and at the same time that the DCT coefficients are being decoded. This speeds up the VLD because the motion vector calculation does not stall the rest of the VLD. Also in this case the same circuitry is used for all four motion vector calculations-motion horizontal forward, motion horizontal backward, motion vertical forward and motion vertical backward-thereby reducing needed circuitry.

Included in the microfiche appendix which is a part of this disclosure is a computer code listing entitled "SCCS: vdetop.vhd". This listing is VHDL code which is a description of the circuitry of the video decompression module as described above. Using appropriate commercially available translation tools, it is easily accomplished to provide circuitry as described by this VHDL code.

Figure 10A:
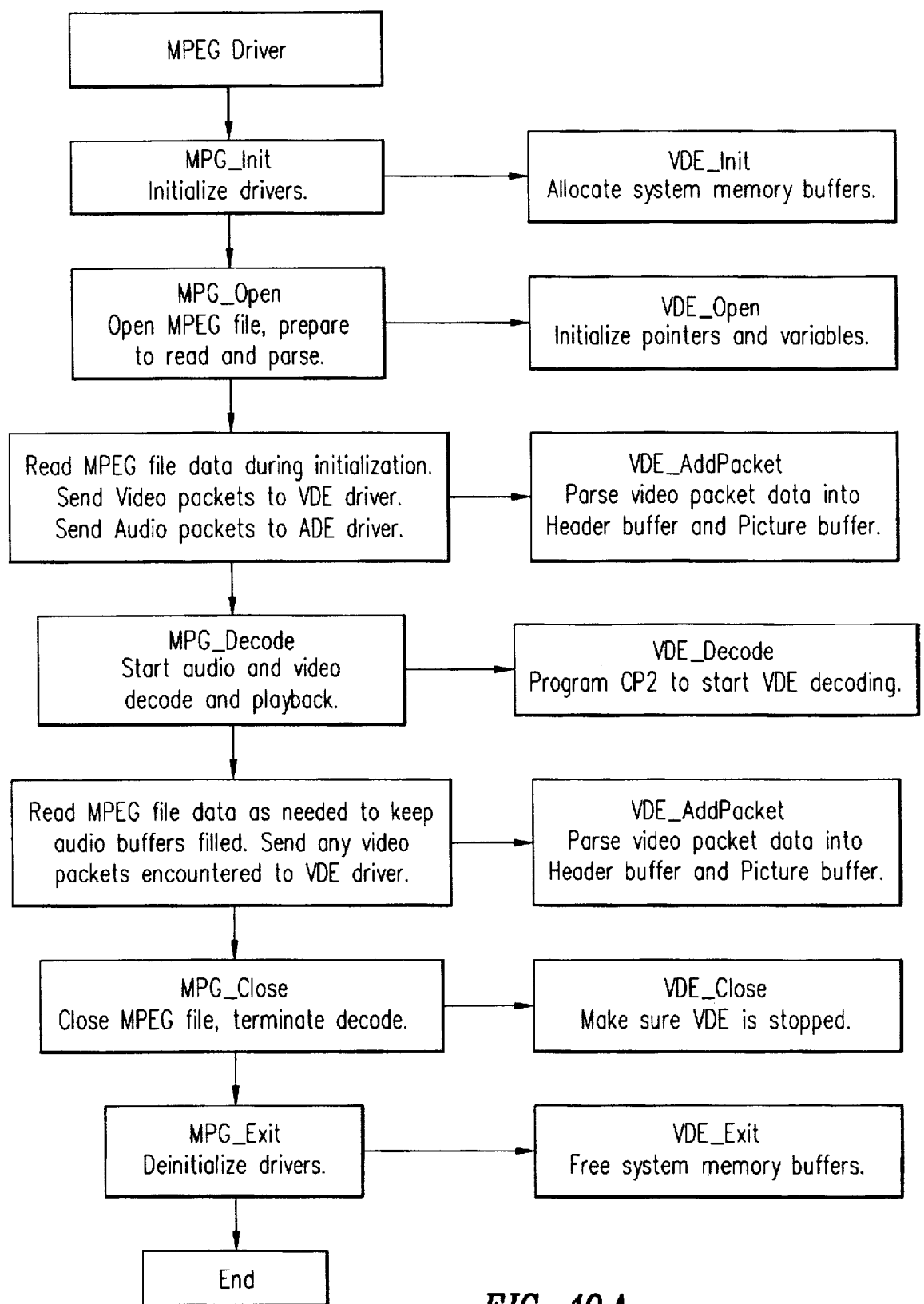
FIGS. 10A and 10F show a flowchart for a computer program for performing higher level video decompression in a host processor.
Figure 10B:
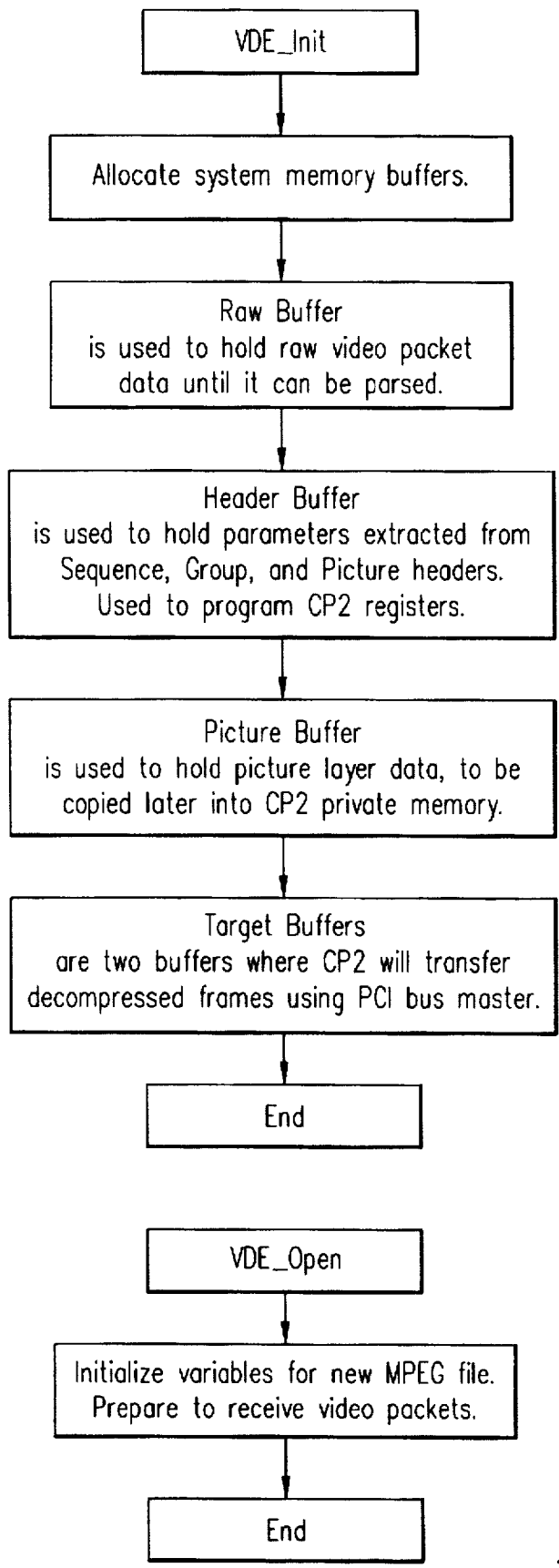
Figure 10C:
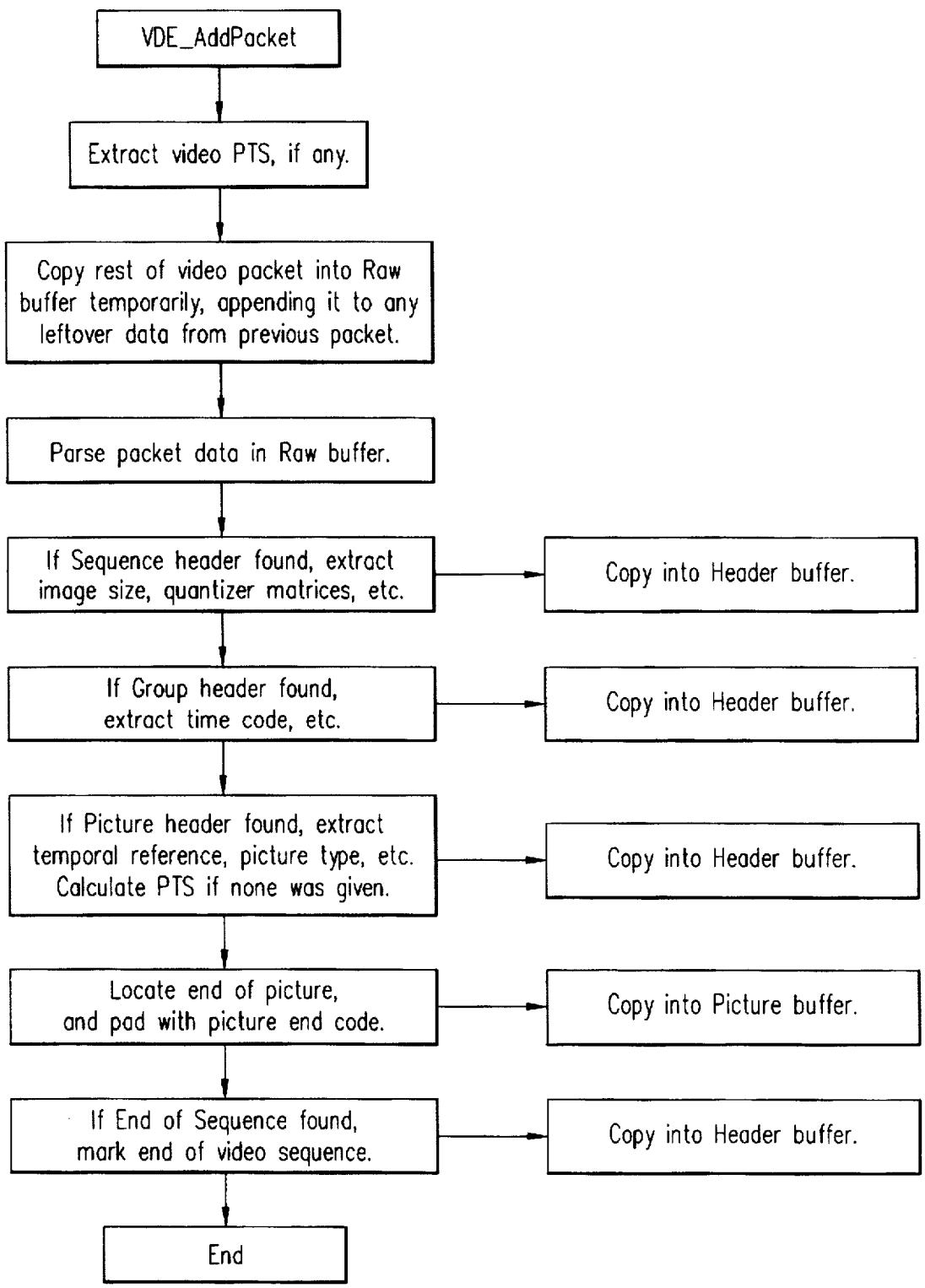
Figure 10D:
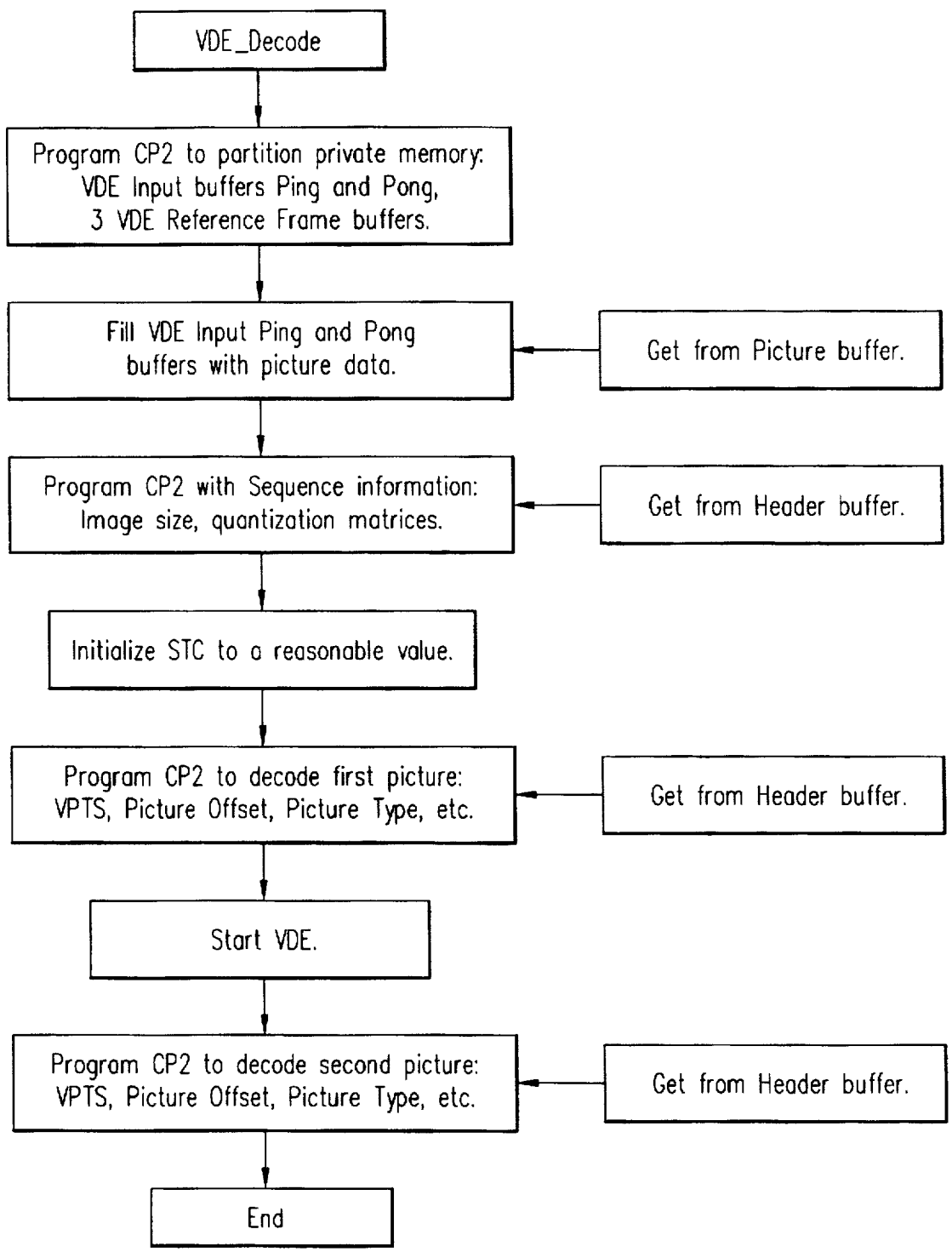
Figure 10E:
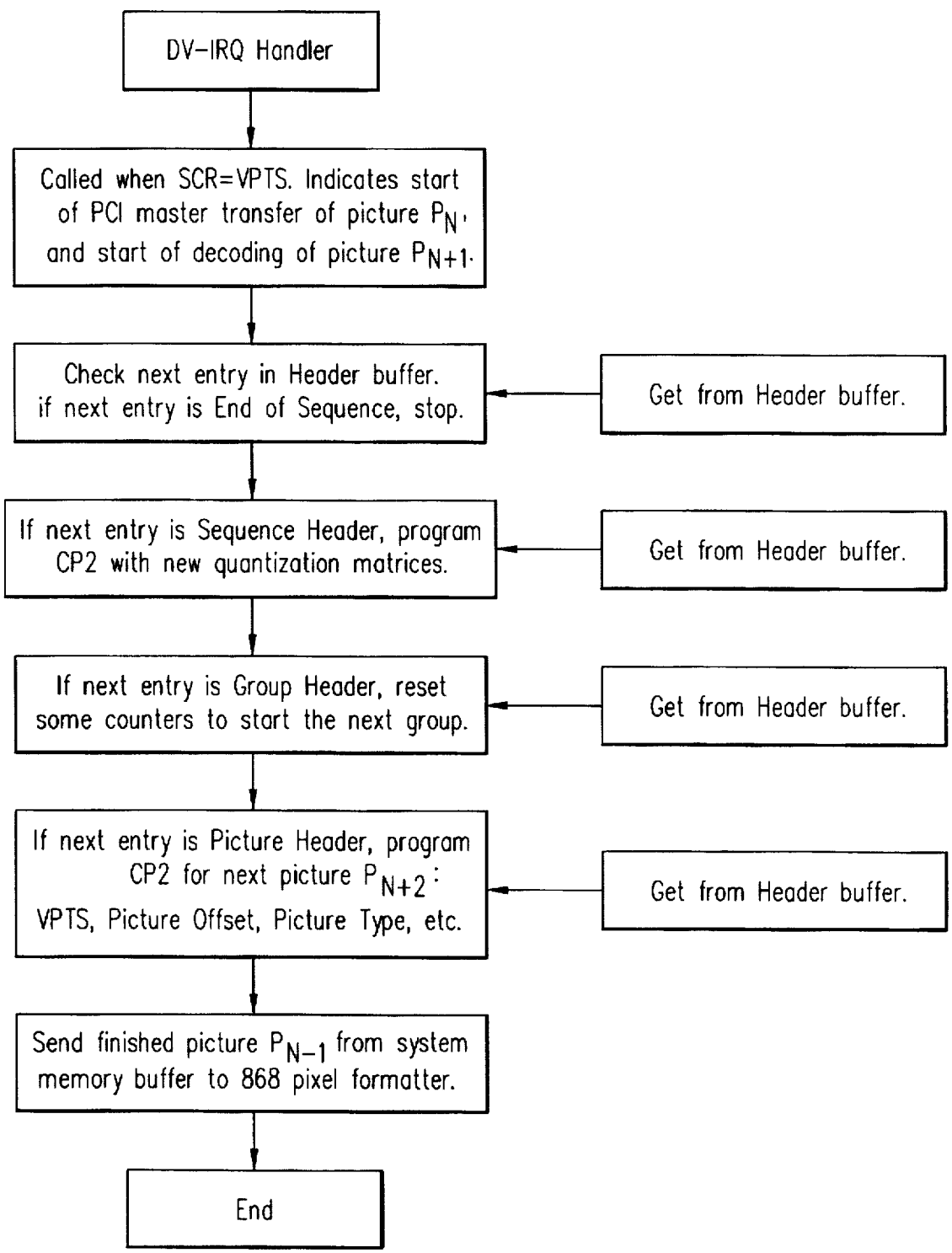
Figure 10F:
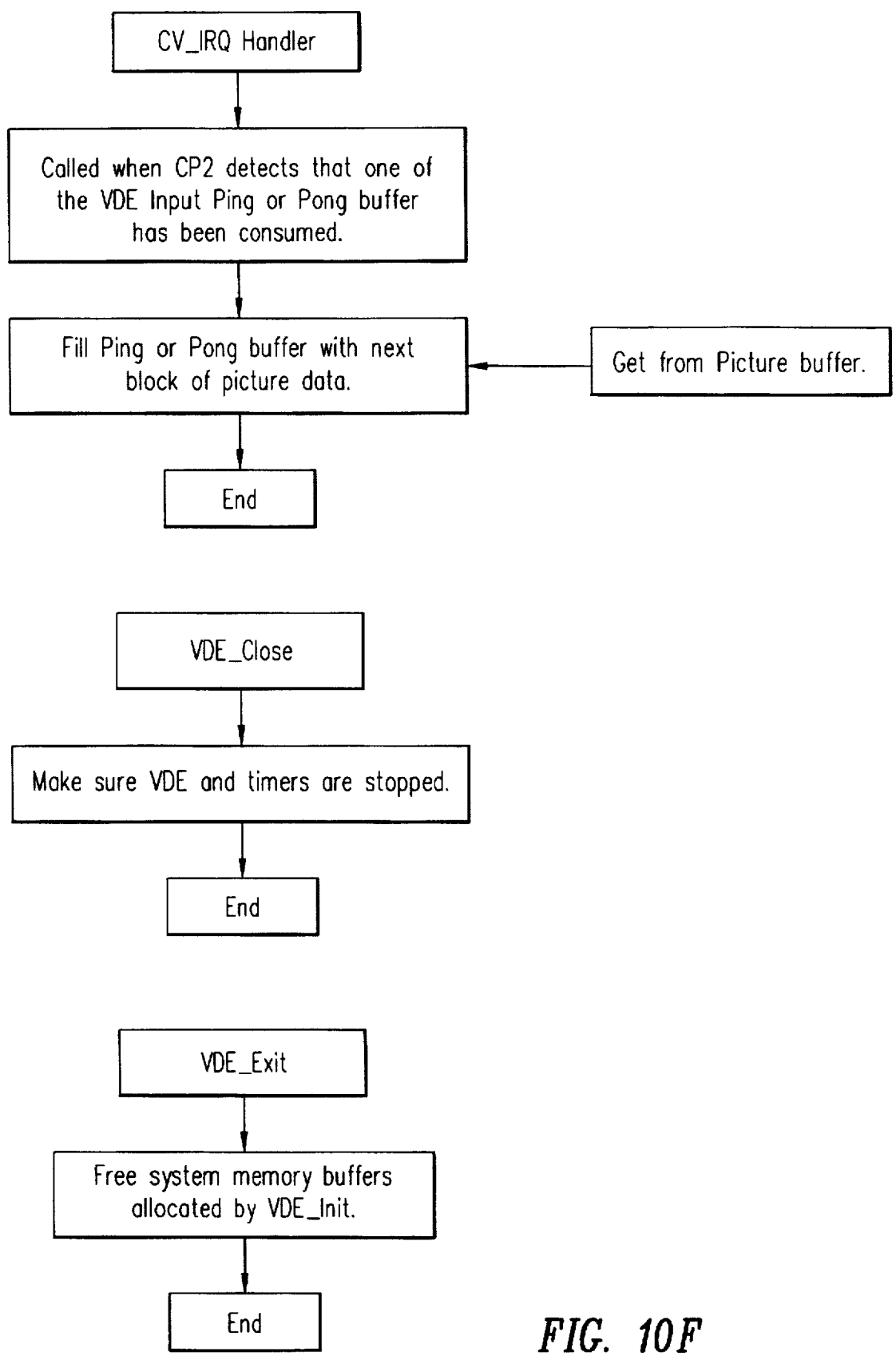

The other element for video decompression referred to above is the software driver (program) executed by the host computer microprocessor. A flow chart of this program is shown in FIGS. 10A through 10F. FIG. 10A shows the MPEG driver modules. This MPEG driver includes code for video decompression, audio decompression and synchronization therebetween. The right hand side of FIG. 10A shows the video decompression, i.e. VDE code, modules. This includes six modules which respectively represent VDE initialization, open, add packet, decode, close and exit. Detail of each of these modules is shown in FIGS. 10B through 10F on a step by step basis. This flow chart is self explanatory to one of ordinary skill in the art, and therefore its content is not repeated here.

An actual computer program which implements this video decompression for the higher level MPEG layers is included in the microfiche appendix and entitled "CP3 VDE Driver—High Level Routines." This is annotated to refer to the various modules shown in the right hand portion of FIG. 10A and also additional related modules involved in the video decompression process. This computer program is written in the "IC" and assembly computer languages.

The various computer code listings herein are not limiting but are illustrative of a particular embodiment of one version of the present invention. It is to be understood that given the description of the embodiments of the invention herein, various implementations of systems in accordance with the invention may be made using different types of computer languages and other circuitry arrangements.

This disclosure includes copyrighted material. The copyright owner gives permission for a facsimile reproduction of the patent document and patent disclosure as this appears in Patent and Trademark Office patent files or records, but otherwise reserves all copyright rights whatsoever.

This disclosure is illustrative and not limiting; further modifications to the process and apparatus disclosed herein will be apparent to one skilled in the art and are intended to fall within the scope of the appended claims.

I claim:

1. A method in a computer system of decompressing data that has been subject to compression and the compressed data being in a set of predetermined data layers, the computer system including a host processor on a first integrated circuit chip connected via a peripheral bus to a secondary processor on a second integrated circuit chip, the method comprising the steps of:

decompressing at least a system layer, which is a higher level layer than a video layer, of the compressed data in the host processor; and decompressing other data layers of the set including the video layer in the secondary processor.

2. The method of claim 1, wherein the secondary processor is a graphics accelerator.

3. The method of claim 1, wherein the secondary processor is a dedicated MPEG decompression circuit for decompression of data subject to MPEG compression and the host processor is a general purpose microprocessor.

4. The method of claim 1, wherein the step of decompressing at least a system layer further comprises decompressing a book layer of the set.

5. The method of claim 1, wherein the data includes audio and video data.

6. The method of claim 1, wherein the step of decompressing other data layers includes the steps of:

variable length decoding the compressed data;

inverse zig-zagging the decoded data;

inverse quantizing the zig-zagged data, and inverse discrete cosine transforming the inverse quantized data.

7. The method of claim 1, wherein the step of decompressing other data layers includes motion vector compensation of the data.

8. A computer system adapted for decompression of compressed data which is in a set of predetermined data layers, comprising:

a host processor on a first integrated circuit chip;

a peripheral bus connected to the host processor;

a secondary processor on a second integrated circuit chip and connected to the peripheral bus; and means for decompressing in the host processor at least a system layer, which is a higher level layer than a video layer, of the compressed data, wherein other data layers of the set including the video layer are decompressed in the secondary processor.

9. The system of claim 8, wherein the secondary processor is a graphics accelerator.

10. The system of claim 8, wherein the secondary processor is a dedicated decompression circuit for decompression of data which has been compressed using MPEG compression and the host processor is a general purpose microprocessor.

11. The system of claim 8, wherein the means for decompressing at least a system layer further comprises decompressing means for decompressing a book layer of the set.

12. The system of claim 8, wherein the data includes audio and video data.

13. The system of claim 8, wherein the means for decompressing at least the system layer includes:

means for variable length decoding the compressed data;

means for inverse zig-zagging the decoded data; and means for inverse quantizing the data.

14. The system of claim 8, wherein decompression of the other layers of the set includes motion vector compensation of the data.

15. The computer system of claim 8, further comprising a frame buffer connected to the secondary processor.

* * * * *